(12) United States Patent
Mitani

(10) Patent No.: US 6,256,266 B1
(45) Date of Patent: Jul. 3, 2001

(54) MAGNETO-OPTICAL RECORDING MEDIUM HAVING LANDS AND GROOVES OF DISCONTINUE REGIONS

(75) Inventor: Kenichiro Mitani, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/382,672

(22) Filed: Aug. 25, 1999

(30) Foreign Application Priority Data

Aug. 28, 1998 (JP) .................................................. 10-243894

(51) Int. Cl.[7] .................................................. G11B 11/00
(52) U.S. Cl. .......................................... 369/13; 369/275.4
(58) Field of Search ............................. 369/275.4, 275.2, 369/275.1, 13; 428/64.4, 64.3, 64.1, 694 ML

(56) References Cited

U.S. PATENT DOCUMENTS

| | | | |
|---|---|---|---|
| 4,744,074 | * | 5/1988 | Imanaka et al. ...................... 369/278 |
| 4,855,991 | * | 8/1989 | Kaku et al. ........................ 369/275.4 |
| 4,879,707 | * | 11/1989 | Getreuer et al. ................... 369/44.26 |
| 5,084,860 | * | 1/1992 | Maeda et al. ..................... 369/275.3 |
| 5,444,682 | * | 8/1995 | Yamada et al. ....................... 369/32 |
| 5,539,724 | * | 7/1996 | Ohtomo ............................ 369/275.4 |
| 6,044,049 | * | 3/2000 | Fujiune et al. .................... 369/44.29 |

* cited by examiner

*Primary Examiner*—Tan Dinh
(74) *Attorney, Agent, or Firm*—Armstrong, Westerman, Hattori, McLeland & Naughton, LLP

(57) ABSTRACT

A magneto-optical recording medium has a plane structure in which are alternately arranged a groove having discontinuous regions formed at every 120 μm, for example, and land having discontinuous regions formed at the same every 120 μm. The position where the discontinuous region of the groove is formed differs from the position where the discontinuous region of the land is formed. The discontinuous region of the land is provided at a position corresponding to substantially the middle of respective continuous regions of the groove. The discontinuous region of the groove is provided at a position corresponding to substantially the center of the continuous region of the land. The width of the groove and land is approximately 0.4 μm. Therefore, a synchronizing signal arising from a discontinuous region formed periodically at the groove or land can be output properly even when the width of the groove and land is narrowed.

10 Claims, 16 Drawing Sheets

MAGNETO-OPTICAL RECORDING MEDIUM HAVING LANDS AND GROOVES OF DISCONTINUE REGIONS

BACKGROUND OF THE INVENTION

1. Field of the Invention

The present invention relates to magneto-optical recording media, particularly to the structure of a magneto-optical recording medium including predetermined periodic discontinuous regions at the land or groove.

2. Description of the Background Art

Attention is focused on the magneto-optical recording medium as a rewritable and reliable recording medium of large storage capacity. The magneto-optical recording medium has began to be actually used as the computer memory and the like. Recently, the standard of AS-MO (Advanced Storaged Magnetic Optical) is in progress as a magneto-optical recording medium having the storage capacity of 6.0 Gbytes for practical usage. As shown in FIG. 1, the magneto-optical recording medium of such a high density has a plane structure in which a groove 40 and land 41 having the width of approximately 0.6 $\mu$m are formed alternately in the radial direction. Discontinuous regions are provided periodically at groove 40 and land 41. More specifically, landed regions 42 are periodically formed at groove 40. Also grooved regions 43 are formed periodically at land 41.

In recording and/or reproducing a signal onto or from the magneto-optical recording medium, discontinuous regions 42 and 43 provided at groove 40 and land 41 are detected to generate a periodic fine clock signal from which a synchronizing signal is generated.

In the magneto-optical recording medium having a plane structure as shown in FIG. 1, further reduction of the width of groove 40 and land 41 for a higher density than the storage capacity of 6.0 Gbytes will result in a lower signal intensity for the detection of discontinuous regions 42 and 43 as shown in FIG. 2. The discontinuous regions 42 and 43 cannot be detected properly. Thus, there is a problem that is difficult to generate an accurate synchronizing signal.

SUMMARY OF THE INVENTION

In view of the foregoing, an object of the present invention is to provide a magneto-optical recording medium that allows accurate detection of discontinuous regions and that allows generation of a stable synchronizing signal even when the width of the groove and land is narrowed for higher density.

According to an aspect of the present invention, a magneto-optical recording medium includes a substrate with grooves and lands. The lands and grooves are provided alternately forming a spiral or concentric track. The land has a plurality of first discontinuous regions formed periodically. The groove has a plurality of second discontinuous regions formed periodically. Each second discontinuous region is positioned corresponding to a region between two first discontinuous regions consecutive in one or the other land adjacent to that groove.

Therefore, a periodic fine clock signal of sufficient intensity can be obtained according to the discontinuous region even when the width of the land and groove is narrow.

Preferably, each second discontinuous region is positioned corresponding to a region at the center of the aforementioned two first discontinuous regions. This facilitates the cutting of the substrate.

According to another aspect of the present invention, a magneto-optical recording medium includes a substrate having grooves and lands. The grooves and lands are provided alternately forming a spiral or concentric track. One of the land and groove is continuous, and the other of the land and groove includes a plurality of discontinuous regions formed periodically.

Since discontinuous regions are to be formed only at the land or groove, fabrication of the magneto-optical recording medium is facilitated.

Preferably, each land and groove has a width equal to or smaller than 0.44 times the spot diameter of the laser beam directed onto the magneto-optical recording medium. Therefore, a periodic fine clock signal of sufficient intensity can be obtained according to the discontinuous region in the land and groove without being limited by the wavelength of the laser beam.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
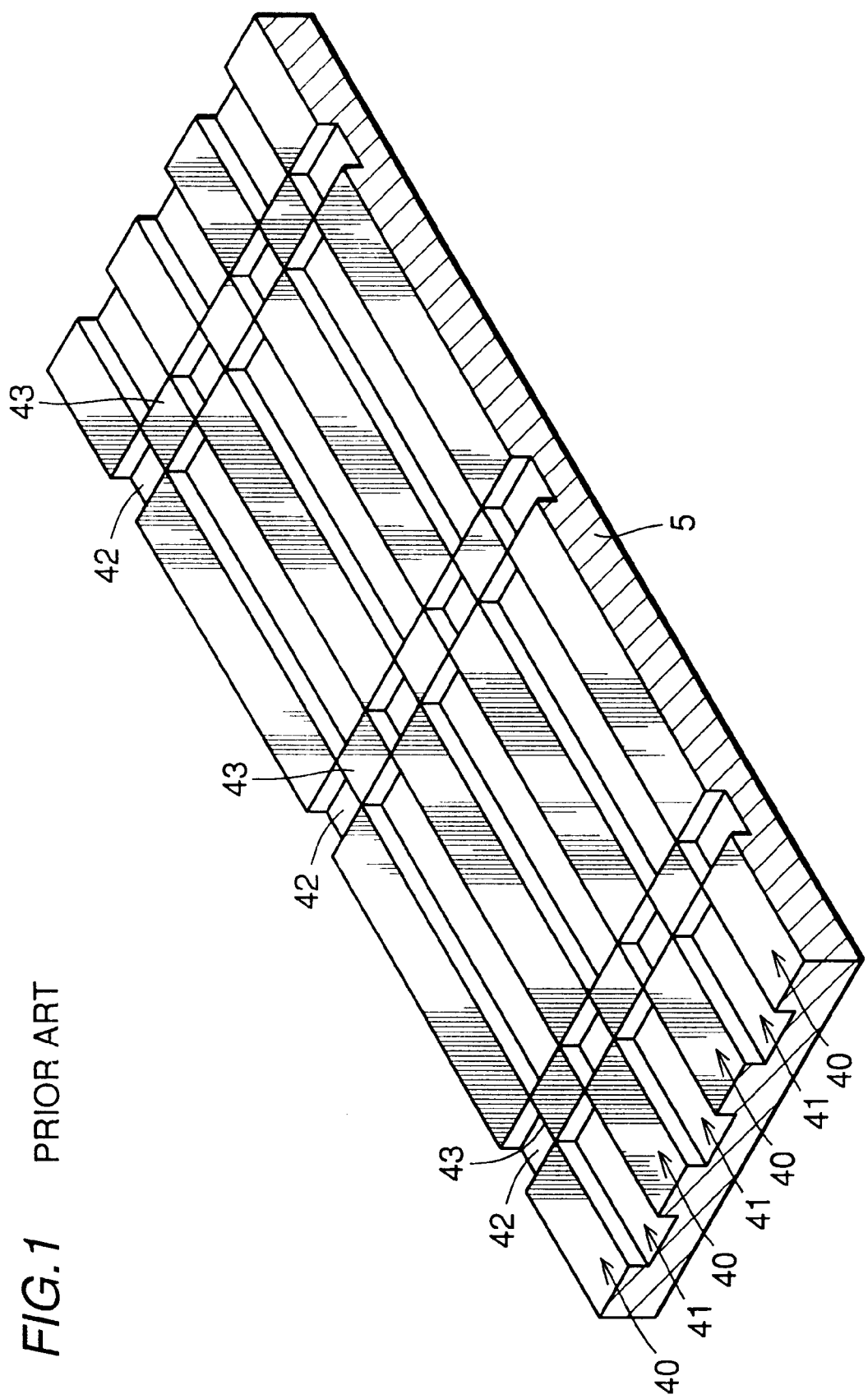
FIG. 1 is a perspective view partially showing a structure of a conventional magneto-optical recording medium.

Embodiments of the present invention will be described hereinafter with reference to the drawings. In the drawings, the same or corresponding component have the same reference characters allotted, and their description will not be repeated.

Figure 3:
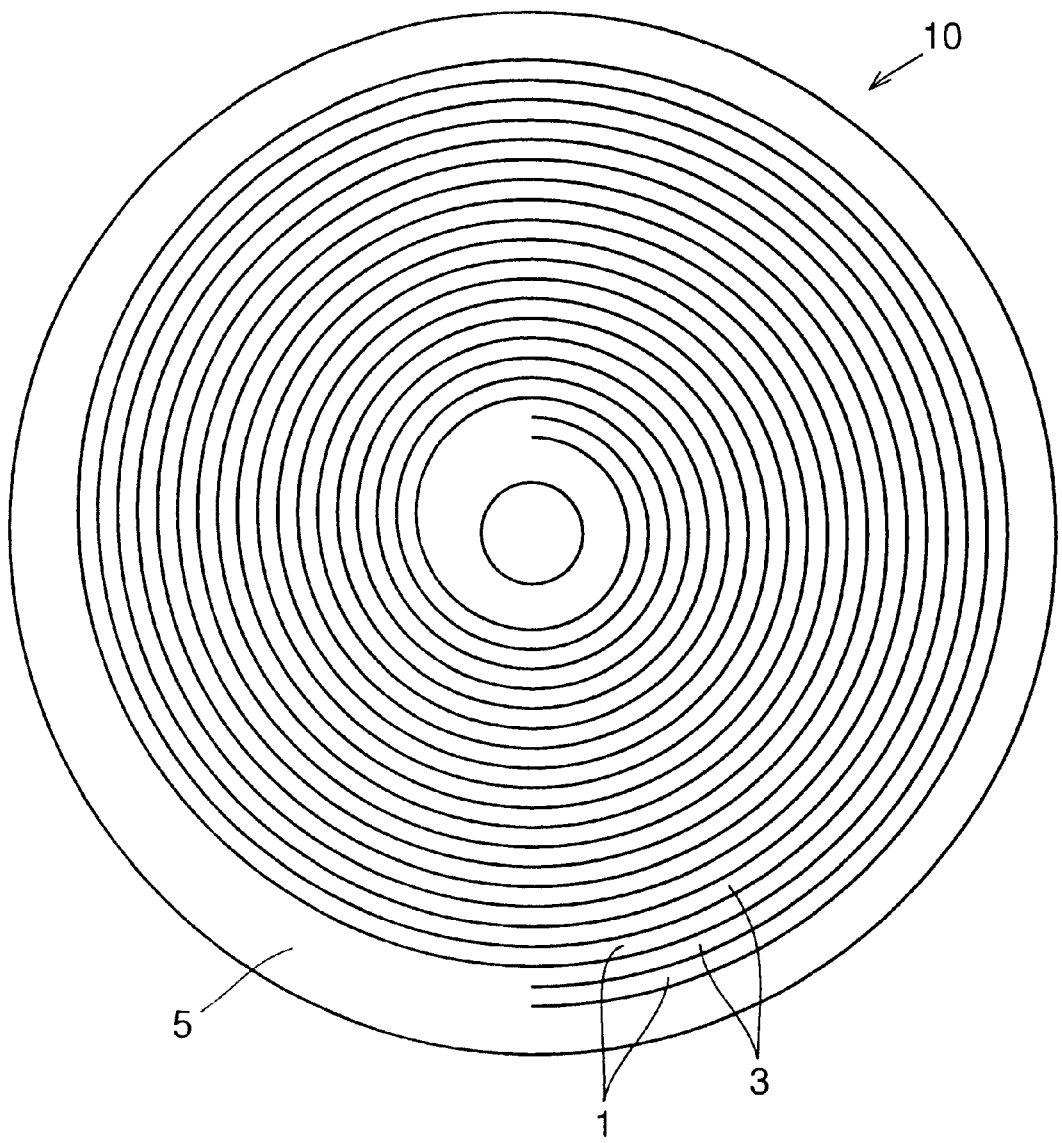
FIG. 3 is a plan view showing the structure of a magneto-optical recording medium according to an embodiment of the present invention.

Referring to FIG. 3, a magneto-optical recording medium 10 according to an embodiment of the present invention includes a transparent substrate 5 having land 3 and groove 1. Land 3 and groove 1 are provide alternately forming a spiral track. Alternatively, a concentric track can be formed.

Figure 4:
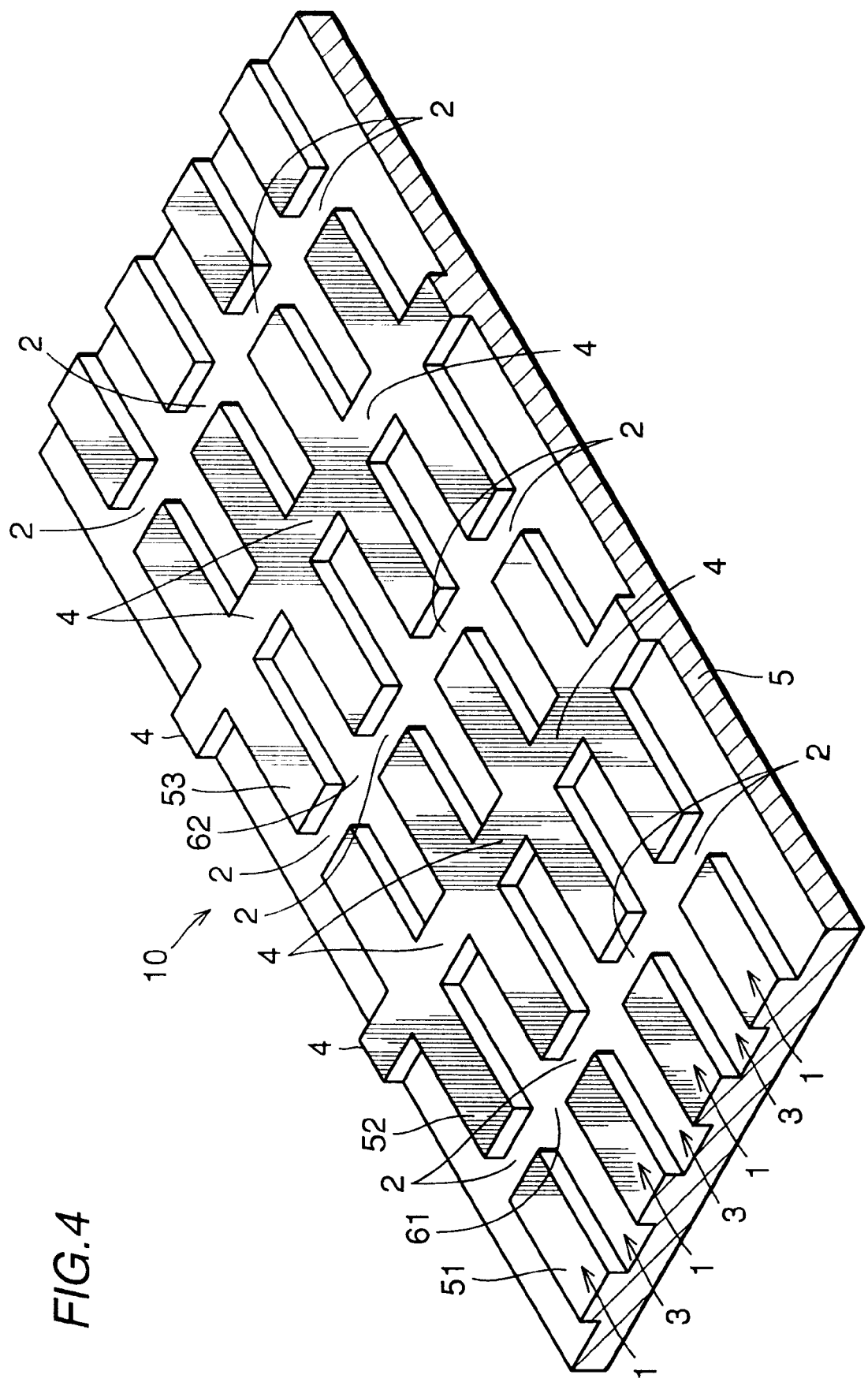
FIG. 4 is a perspective view partially showing the structure of the magneto-optical recording medium of FIG. 3.

Referring to FIG. 4, a magnetic film (not shown) is formed to record a signal on both groove 1 and land 3. Groove 1 and land 3 are scanned by a laser beam emitted from the direction of substrate 5. When viewed from the emitting side of the laser beam, groove 1 is concave and land 3 is convex.

Each groove 1 includes a plurality of discontinuous regions 2 formed periodically such as for every 120 μm. Also, each land 3 includes a plurality of discontinuous regions 4 formed periodically such as for every 120 μm. Thus, groove 1 is not formed continuously, and is interrupted by land-like discontinuous region 2. Similarly, land 3 is not formed continuously, and is interrupted by groove-like discontinuous region 4.

Discontinuous regions 2 and 4 are not adjacent to each other as in the conventional case, and do not align radially. More specifically, each discontinuous region 2 in each groove 1 is positioned corresponding to a region at the exact center between two discontinuous regions 4 and 4 consecutive in one or the other land 3 adjacent to groove 1. In other words, discontinuous region 4 in each land 3 is positioned corresponding to a region exactly at the center between two discontinuous regions 2 and 2 consecutive in one or the other groove 1 adjacent to land 3.

Thus, discontinuous regions 2 and 4 differ in their location. Discontinuous region 4 of land 3 is positioned corresponding to a region substantially at the center of each continuous regions 51, 52 and 53 of groove 1. Discontinuous region 2 of groove 1 is positioned corresponding to a region substantially at the center of continuous regions 61 and 62 of land 3. The width of groove 1 and land 3 is approximately 0.4 μm.

By directing a laser beam to magneto-optical recording medium 10 having the plane structure of FIG. 4 and then detecting light reflected therefrom, a periodic fine clock signal arising from discontinuous regions 2 and 4 is detected. A synchronizing signal used in signal recording and/or reproduction is generated according to that detected fine clock signal.

Figure 5:
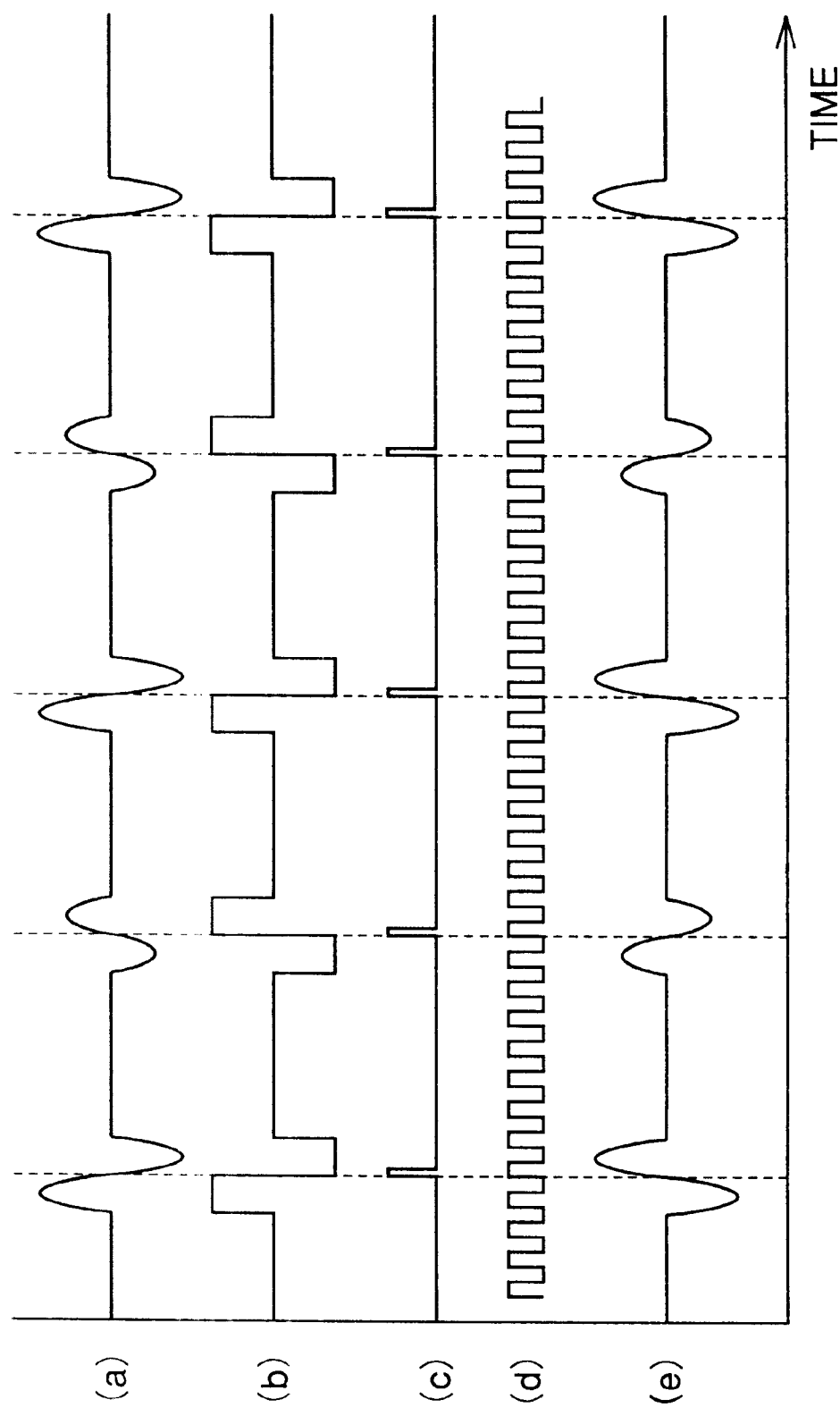
FIG. 5 is a timing chart of a signal sequentially generated according to discontinuous regions in the land and groove of FIG. 4.

Generation of a synchronizing signal according to a fine clock signal detected on the basis of discontinuous region 2 and 4 will be described with reference to FIG. 5. When groove 1 of magneto-optical recording medium 10 is scanned by a laser beam, a fine clock signal (a) arising from discontinuous regions 2 and 4 is detected. Detected signal (a) is compared with a predetermined level, whereby a signal (b) is generated. According to signal (b), a pulse signal (c) is generated. A synchronizing signal (d) including a predetermined number of periodic signals, for example 532 periodic signals, is generated between each pulse component of pulse signal (c).

When land 3 is scanned by the laser beam, a fine clock signal (e) arising from discontinuous regions 2 and 4 is detected. A synchronizing signal (d) is generated from signal (e) by a method similar to that described above.

Figure 2:
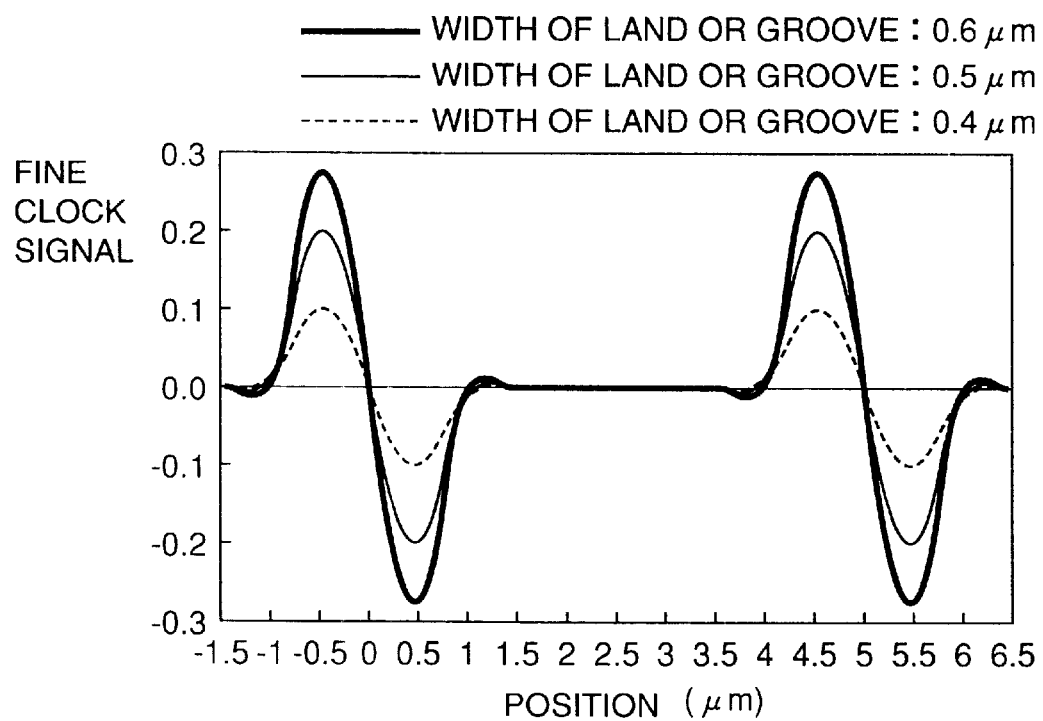
FIG. 2 shows the change in intensity of a fine clock signal generated according to discontinuous regions when the width of the land and groove of FIG. 1 is narrowed.
Figure 6:
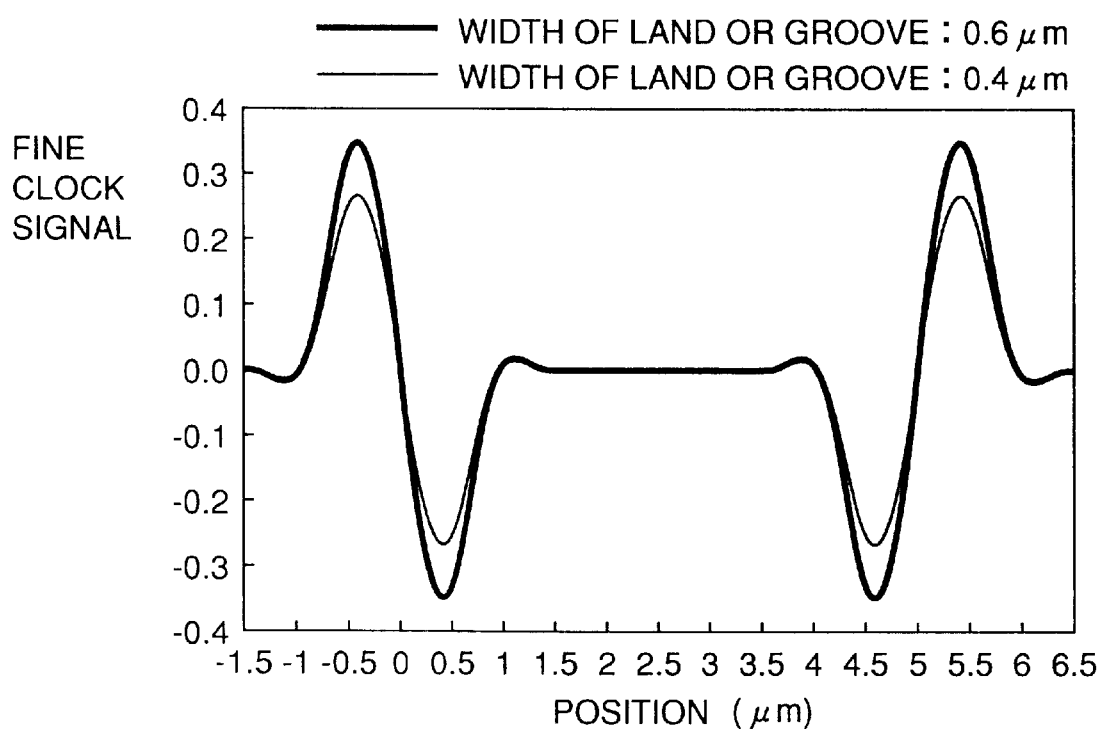
FIG. 6 shows the change in intensity of a fine clock signal generated according to discontinuous regions when the width of the land and groove of FIG. 4 is narrowed.

It is appreciated from FIG. 6 that reduction in the intensity of the fine clock signal detected arising from discontinuous regions 2 and 4 is small even when the width of the land or groove is narrowed from 0.6 μm to 0.4 μm in magneto-optical recording medium 10 having the plane structure of FIG. 4. A signal of a sufficient intensity arising from discontinuous regions 2 and 4 can be detected even when the width of the land or groove is narrowed than that of the conventional magneto-optical recording medium of FIG. 2.

Therefore, the plane structure shown in FIG. 4 is effective for a magneto-optical recording medium directed to increase the density by narrowing the width of groove 1 and land 3.

Figure 7:
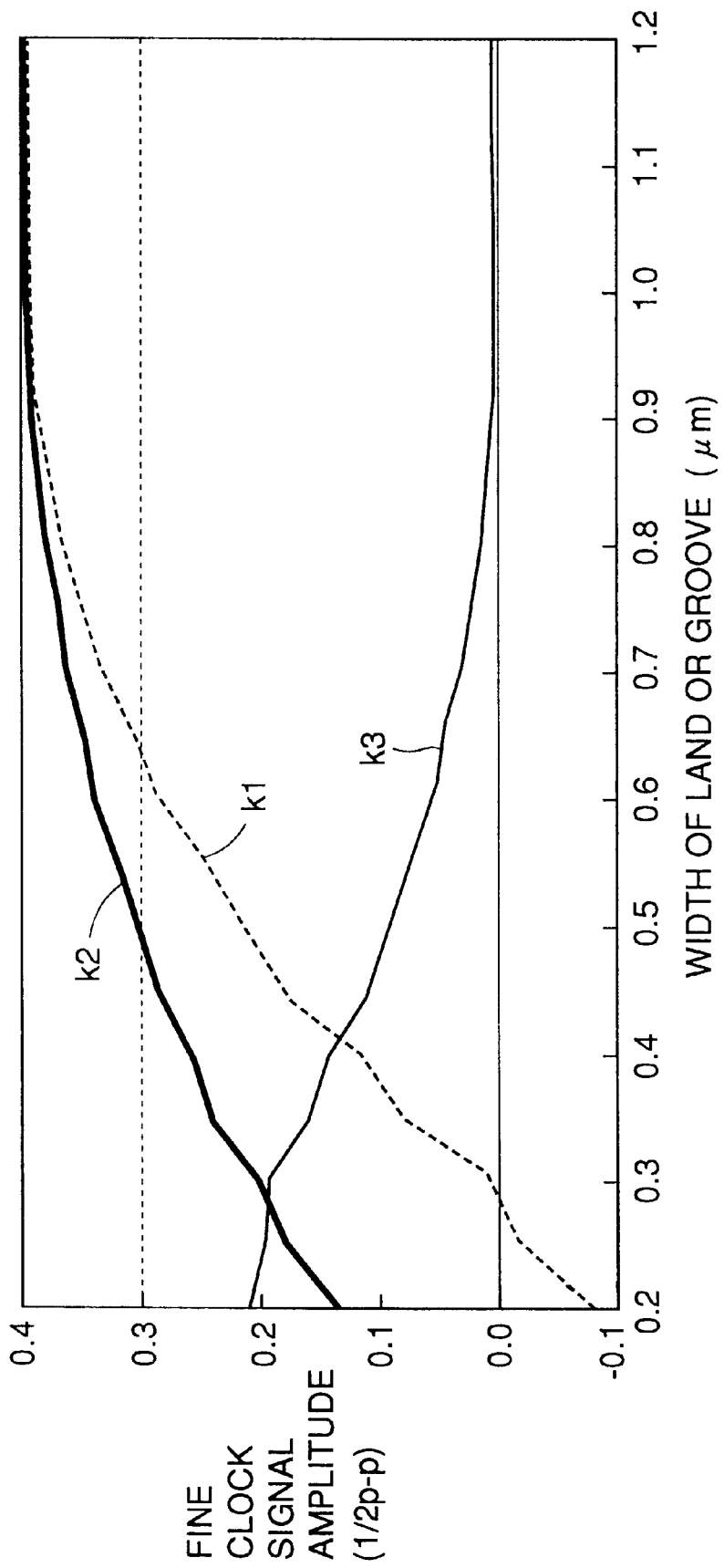
FIG. 7 shows the dependency of the intensity of the fine clock signal generated according to discontinuous regions on the land and groove width in a conventional magneto-optical recording medium and the inventive magneto-optical recording medium.

The relationship between the width of the land or groove and the signal intensity detected arising from discontinuous regions 2 and 4 for a magneto-optical recording medium having the conventional plane structure (curve k1) and for a magneto-optical recording medium having the plane structure of FIG. 4 (curve k2) is shown in FIG. 7. It is appreciated that the signal intensity is greater than that of the conventional magneto-optical recording medium when the width of the groove or land is not more than 0.9 μm.

When the currently available optical system in which the laser beam of 635 nm in wavelength has a spot diameter of approximately 0.9 μm on a magneto-optical recording medium is employed, the signal arising from the discontinuous region has intensity sufficient for detection as long as the magneto-optical recording medium has a plane structure in which the width of the land or groove is smaller than the spot diameter of the laser beam on the magneto-optical recording medium.

The magneto-optical recording medium of the present invention is not limited to that shown in FIG. 4. A magneto-optical recording medium 20 shown in FIG. 8 can be employed. Magneto-optical recording medium 20 has a plane structure in which a groove 21 absent of discontinuous regions and land 3 having discontinuous regions 4 formed at a constant interval are arranged alternately. The width of groove 21 and land 3 is 0.4 μm in magneto-optical recording medium 20.

In magneto-optical recording medium 20, a periodic fine clock signal is detected from which a synchronizing signal is generated. Generation of a synchronizing signal according to a fine clock signal detected by directing a laser beam onto magneto-optical recording medium 20 having the plane structure of FIG. 8 will be described with reference to FIG. 9. When groove 21 is scanned by the laser beam, the intensity of the reflected light is constant at the continuous region. When the laser beam comes to the position corresponding to discontinuous region 4 in land 3, the intensity of the reflected light becomes lower. Upon passage of the area corresponding to discontinuous region 4, the intensity of the reflected light attains the former level. When the laser beam comes to the position corresponding to discontinuous region 4, the intensity of the reflected light is reduced again. Therefore, when groove 21 is scanned by the laser beam, a fine clock signal (f) is detected. Detected signal (f) is compared with a predetermined level, and a signal (g) is generated. Then, a pulse signal (h) is generated according to signal (g). A synchronizing signal (i) including a predetermined number of periodic signals, for example, 532 periodic signals, is generated between each pulse component of pulse signal (h).

When land 3 is scanned by the laser beam, a fine clock signal (j) arising from discontinuous region 4 is detected. A synchronizing signal (i) is generated in a manner similar to that described above from signal (j).

Upon comparing signals (f) and (j), it is appreciated that the peak arising from discontinuous region 4 is greater for signal (j). This is due to the fact that, in the scan of land 3, land 3 of high reflectance and discontinuous region 4 of low reflectance are scanned by the portion of the laser beam having high intensity, resulting in a greater change in the detected reflected light intensity.

Figure 10:
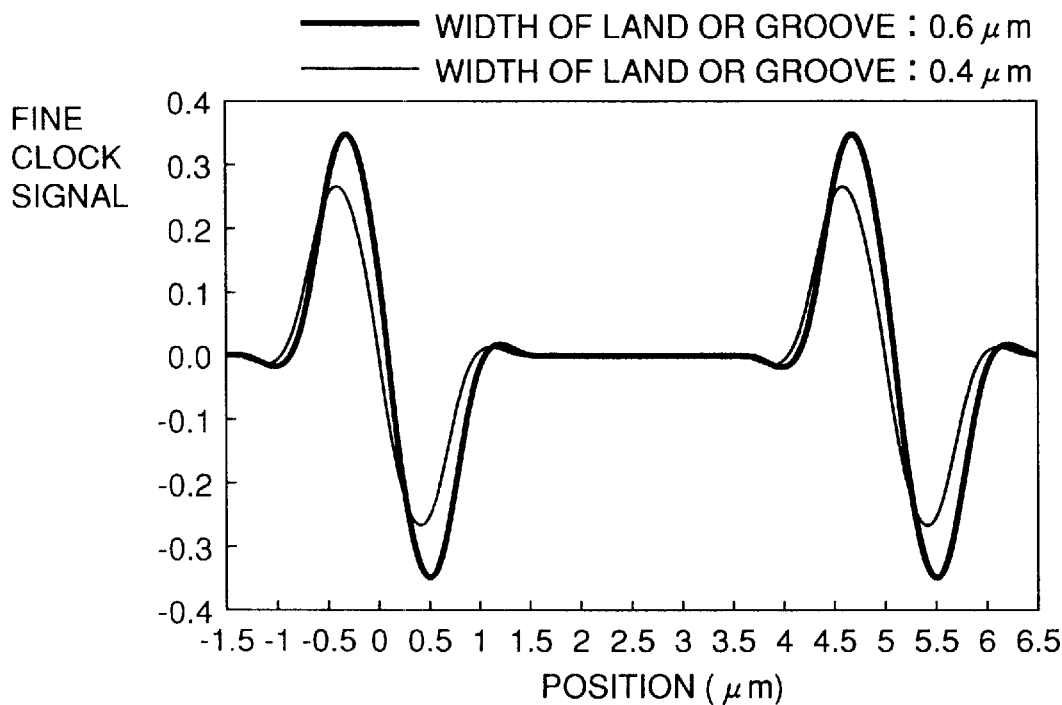
FIG. 10 shows the change in intensity of a fine clock signal generated according to discontinuous regions in the groove when the width of the land and groove of FIG. 8 is narrowed.
Figure 11:
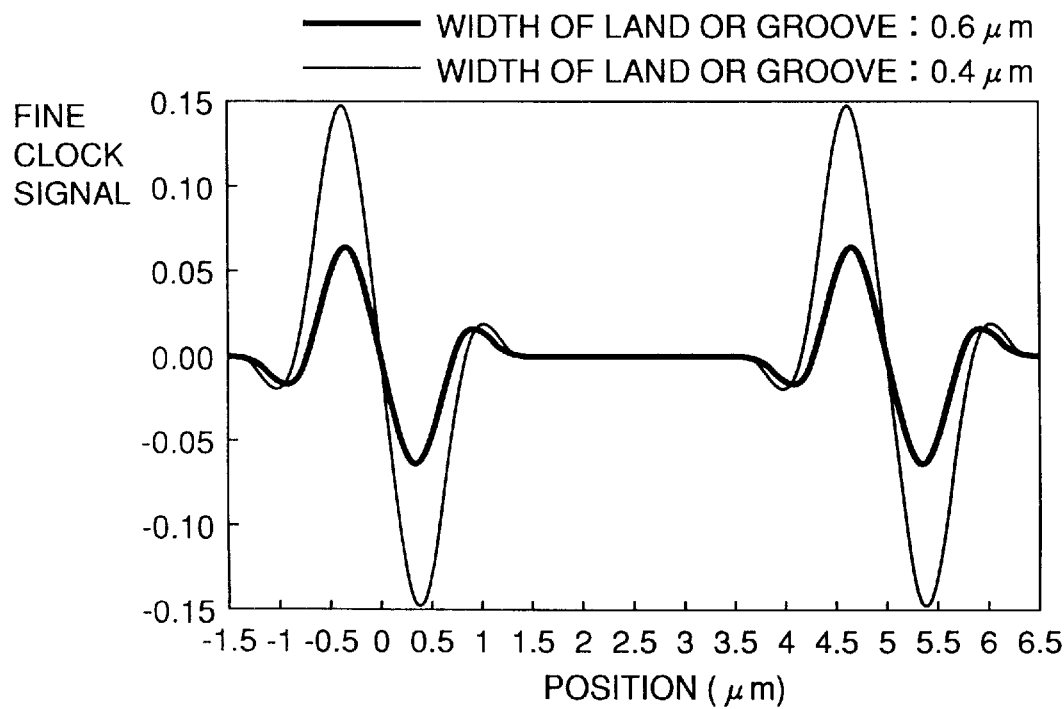
FIG. 11 shows the change in intensity of a fine clock signal generated according to discontinuous regions in the land when the width of the land and groove of FIG. 8 is narrowed.

FIGS. 10 and 11 show the result of simulation of a signal detected arising from discontinuous region 4 when land 3 with discontinuous region 4 and continuous groove 21 are scanned. When land 3 is scanned by the laser beam, reduction in the signal intensity detected arising from discontinuous region 4 is small even when the width of land 3 and groove 21 is narrowed from 0.6 $\mu$m to 0.4 $\mu$m (refer to FIG. 10). When groove 21 is scanned by the laser beam, the signal intensity detected arising from discontinuous region 4 exhibits a reduction of only approximately ⅔ when the width of land 3 and groove 21 is narrowed from 0.6 $\mu$m to 0.4 $\mu$m. Therefore, the intensity sufficient for signal detection is maintained.

The peak intensity of a fine clock signal detected arising from discontinuous region 4 is lower in the case where continuous groove 21 is scanned by the laser beam. However when groove 21 is scanned corresponding to a more narrow width of the groove and land, the change in the reflected light intensity becomes greater at the area of discontinuous region 4 since the effect of adjacent lands 3 and 3 increases. As a result, a stable synchronizing signal can be generated without reduction in the peak intensity of the fine clock signal detected arising from discontinuous regions even when the width of the groove and land is narrowed for higher density in the magneto-optical recording medium having the plane structure of FIG. 8.

Figure 8:
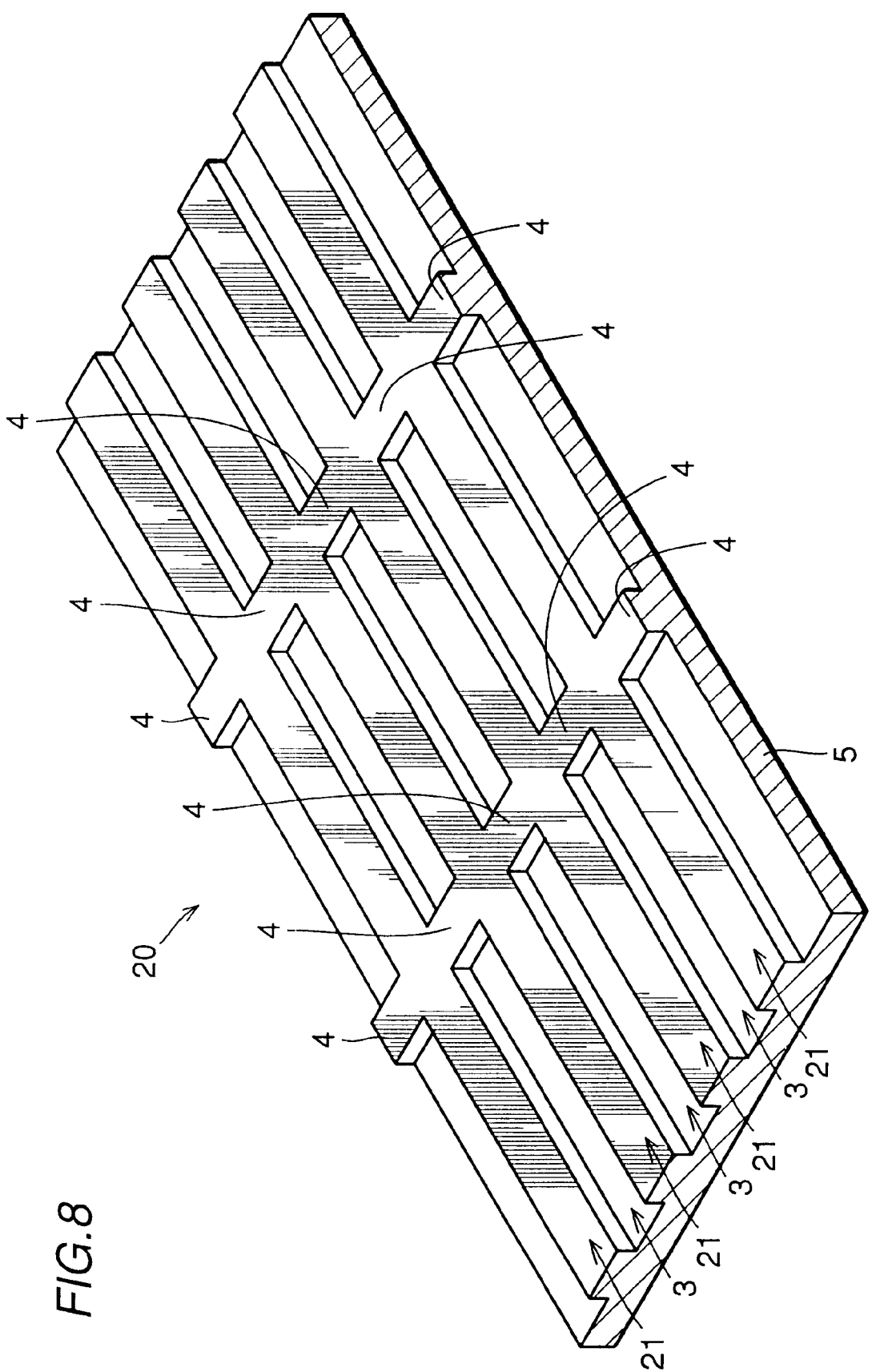
FIG. 8 is a perspective view partially showing a structure of a magneto-optical recording medium according to another embodiment of the present invention.
Figure 9:
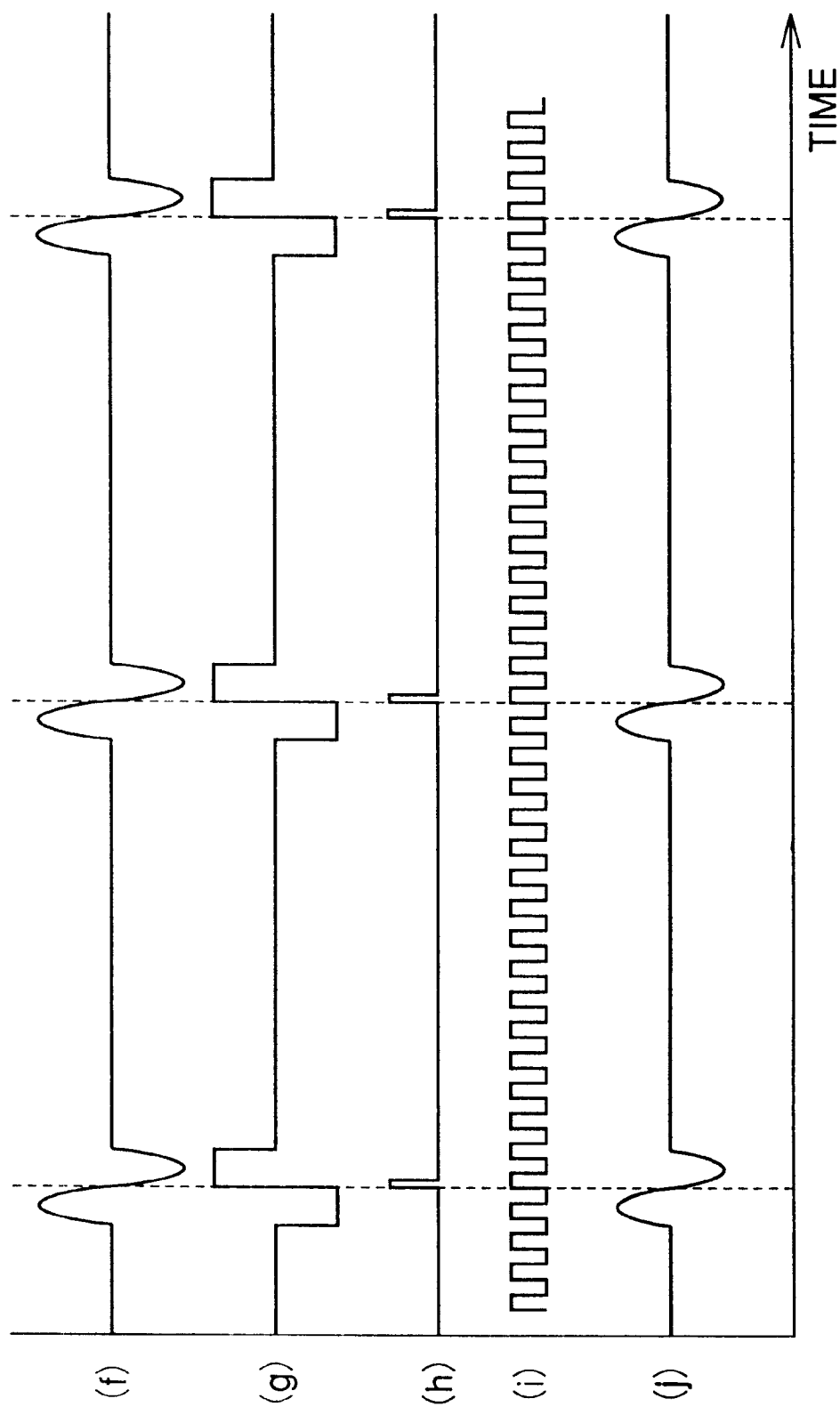
FIG. 9 is a timing chart of a signal sequentially generated according to discontinuous regions in the land and groove of FIG. 8.

The relationship between the width of the land or groove and the signal intensity detected arising from discontinuous region 4 is shown for a magneto-optical recording medium having the conventional plane structure (curve k1) and the magneto-optical recording medium having the plane structure of FIG. 8 (curve k3) is shown in FIG. 7. When the width of land 3 or groove 21 is not more than 0.4 $\mu$m, the signal intensity arising from discontinuous region 4 is greater for the magneto-optical recording medium having the plane structure of FIG. 8 than the conventional magneto-optical recording medium. When the currently available optical system in which the laser beam of 635 nm in wavelength has a spot diameter of approximately 0.9 $\mu$m on the magneto-optical recording medium is employed, the signal arising from discontinuous region 4 has intensity sufficient for detection in a magneto-optical recording medium having land 3 or groove 21 of a width satisfying the relationship of $TP \leq 0.44 p$ where p is the spot diameter of the laser beam on the magneto-optical recording medium and TP is the width of land 3 or groove 21.

The above description corresponds to the case where discontinuous region 4 is formed at only land 3. However, the same applies for the case where discontinuous region 4 is formed at only groove 21.

Magneto-optical recording media 10 and 20 having the plane structure of FIGS. 4 and 8 can easily be fabricated by substrate cutting using the generally applied 2-beam.

Figure 12:
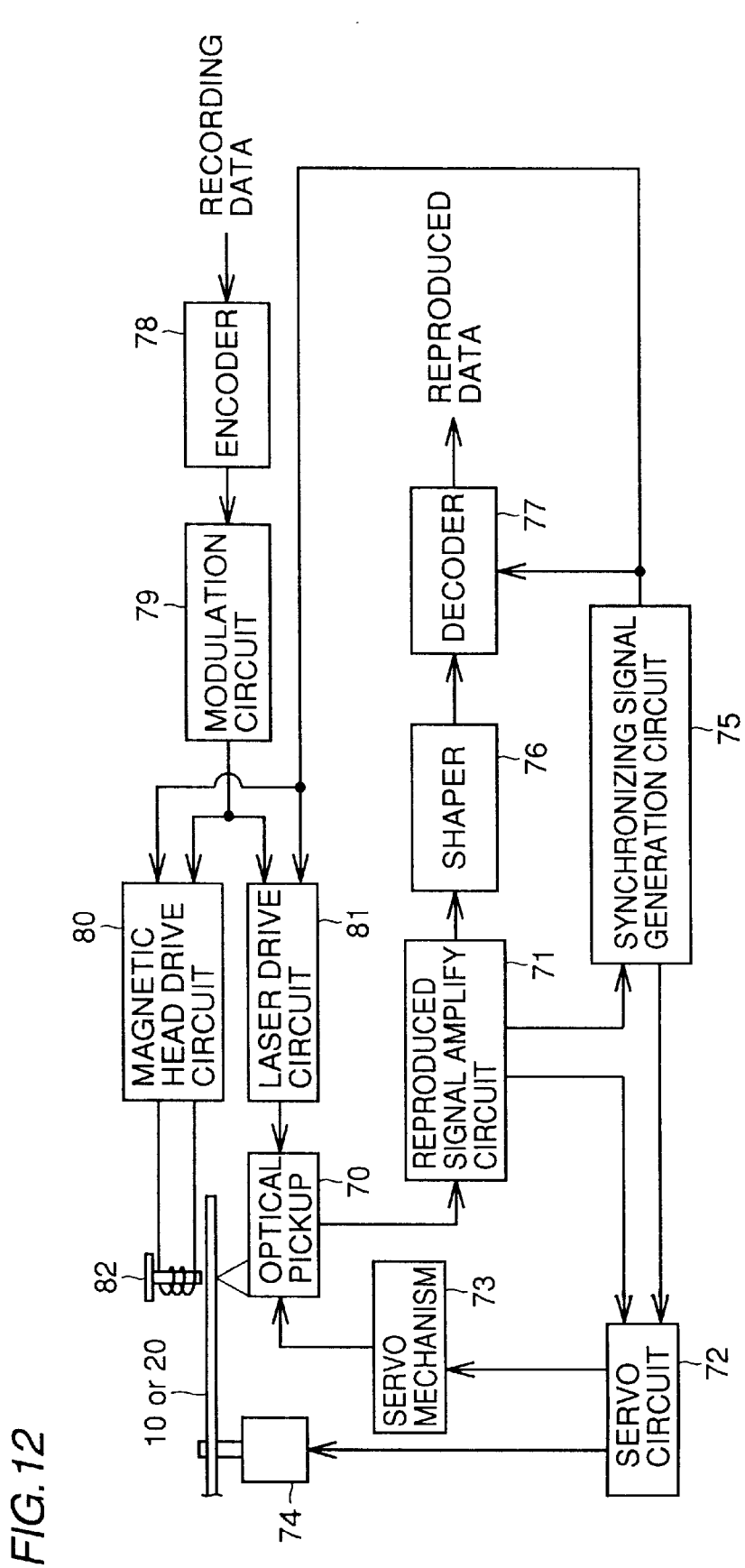
FIG. 12 is a block diagram showing a structure of a recording/reproduction apparatus to record and reproduce a signal onto and from a magneto-optical recording medium.

FIG. 12 is a block diagram of a recording/reproduction apparatus that records and/or reproduces a signal onto or from magneto-optical recording media 10 and 20 having the plane structure of FIGS. 4 and 8. The recording/reproduction apparatus includes an optical pickup 70, a reproduced signal amplify circuit 71, a servo circuit 72, a servo mechanism 73, a spindle motor 74, a synchronizing signal generation circuit 75, a shaper 76, a decoder 77, an encoder 78, a modulation circuit 79, a magnetic head drive circuit 80, a laser drive circuit 81, and a magnetic head 82. Magnetic head 82 applies a magnetic field to record a signal onto magneto-optical recording medium 10 (or 20). Optical pickup 70 directs a laser beam from the transparent substrate side onto magneto-optical recording medium 10 (or 20) for signal recording or reproduction. Light reflected therefrom is detected. Reproduced signal amplify circuit 71 receives the signal from a photo detector (not shown) in optical pickup 70 and applies a predetermined process on the input signal. The obtained tracking error signal and focus error signal are amplified to a predetermined value, and then provided to servo circuit 72. Also, the optical signal detected arising from discontinuous regions 2 and 4 (or discontinuous region 4) formed at groove 1 or land 3 of magneto-optical recording medium 10 (or 20) is amplified to a predetermined value, and then applied to synchronizing signal generation circuit 75. Furthermore, the magneto-optical signal is amplified to a predetermined value, and then provided to shaper 76. Synchronizing signal generation circuit 75 generates a synchronizing signal as will be described afterwards to provide the generated synchronizing signal to servo circuit 72, decoder 77, magnetic head drive circuit 80 or laser drive circuit 81. Servo circuit 72 rotates spindle motor 74 in synchronization with the synchronizing signal output from synchronizing signal generation circuit 75, and provides control of servo mechanism 73 according to a tracking error signal and focus error signal output from reproduced signal amplify circuit 71. Spindle motor 74 rotates in synchronization with the synchronizing signal to rotate magneto-optical recording medium 10 (or 20) at a predetermined rotary speed. Servo mechanism 73 effects tracking servo and focus servo of the objective lens (not shown) in optical pickup 70 according to the control of servo circuit 72.

Shaper 76 removes the noise from the magneto-optical signal output from reproduced signal amplify circuit 71 to provide the processed signal to decoder 77. Decoder 77 decodes the magneto-optical signal in synchronization with the synchronizing signal output from synchronizing signal generation circuit 75 and outputs the decoded signal as reproduced data.

In a signal recording operation, encoder 78 encodes and provides to modulation circuit 79 the recorded data. Modulation circuit 79 modulates the data signal from encoder 78 according to a predetermined system. Magnetic head drive circuit 80 drives magnetic head 82. Laser drive circuit 81 drives the semiconductor laser (not shown) in optical pickup 70. In the case of the optical modulation system, magnetic head drive circuit 80 drives magnetic head 82 so as to apply a constant magnetic field towards magneto-optical recording medium 10 (or 20). Laser drive circuit 81 drives the semiconductor laser in response to the synchronizing signal and the data signal from modulation circuit 79. When in the case of the magnetic field modulation system, laser drive circuit 81 drives the semiconductor laser so that a constant laser beam is directed onto magneto-optical recording medium 10 (or 20). Magnetic head drive circuit 80 drives magnetic head 82 in response to the synchronizing signal and the data signal from modulation circuit 79.

Details of synchronizing signal generation circuit 75 will be described here with reference to FIG. 13. Synchronizing signal generation circuit 75 includes a comparator 751, a pulse generation circuit 752, and a frequency divider 753. Comparator 751 compares a fine clock signal (a) (or (e) or (f) or (j)) detected arising from the discontinuous region output from reproduced signal amplify circuit 71 with a predetermined level to output a signal (b) (or signal (g)). Pulse generation circuit 753 outputs a pulse signal (c) (or signal (h)) according to signal (b) (or signal (g)). Frequency divider 754 outputs a synchronizing signal (d) (or signal (i)) according to pulse signal (c) (or signal (h)).

Figure 13:
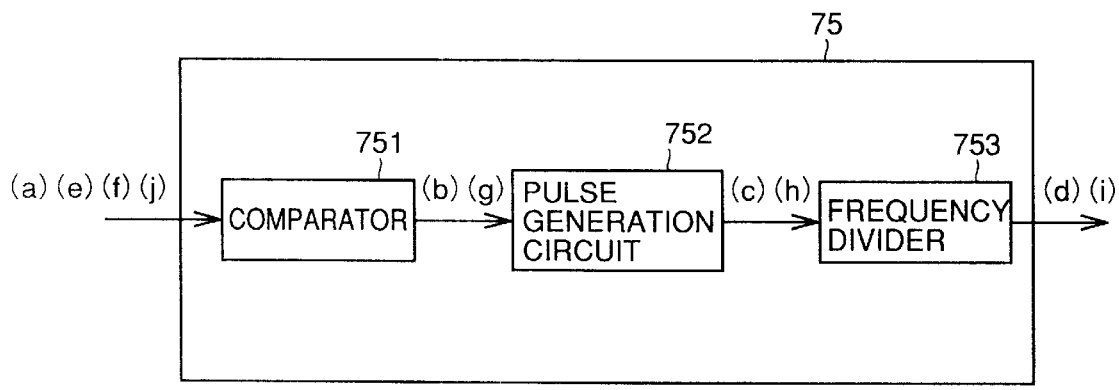
FIG. 13 is a block diagram showing a structure of the synchronizing signal generation circuit of FIG. 12.

Using the recording/reproduction apparatus of FIGS. 12 and 13, the fine clock signal arising from discontinuous regions 2 and 4 provided in magneto-optical media 10 and 20 is detected from which a synchronizing signal (d) (or signal (i)) is generated. This signal is used as the clock signal for signal recording or reproduction.

Figure 14:
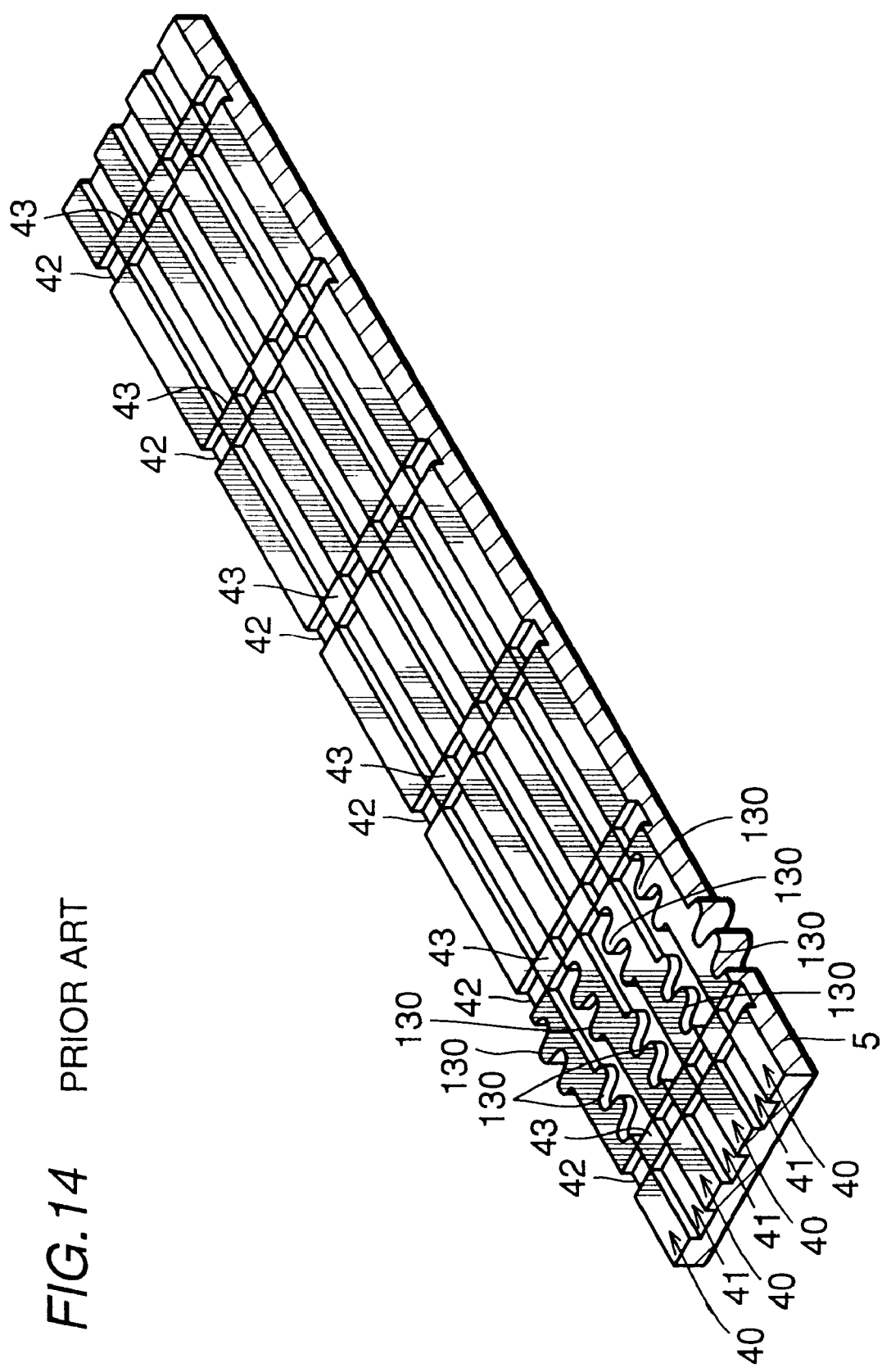
FIG. 14 is a perspective view partially showing a structure of a conventional magneto-optical recording medium in which address information is recorded.

In the magneto-optical recording medium, the address information is recorded in wobble at the wall of the groove. In the standard AS-MO as shown in FIG. 14, address information is recorded in wobble 130 alternately at the wall on both sides of groove 40. In this case, the address information recorded at both sidewalls in groove 40 is identical. This is to allow detection of the address information property even when the magneto-optical recording medium is tilted by the warp of the substrate.

Figure 15:
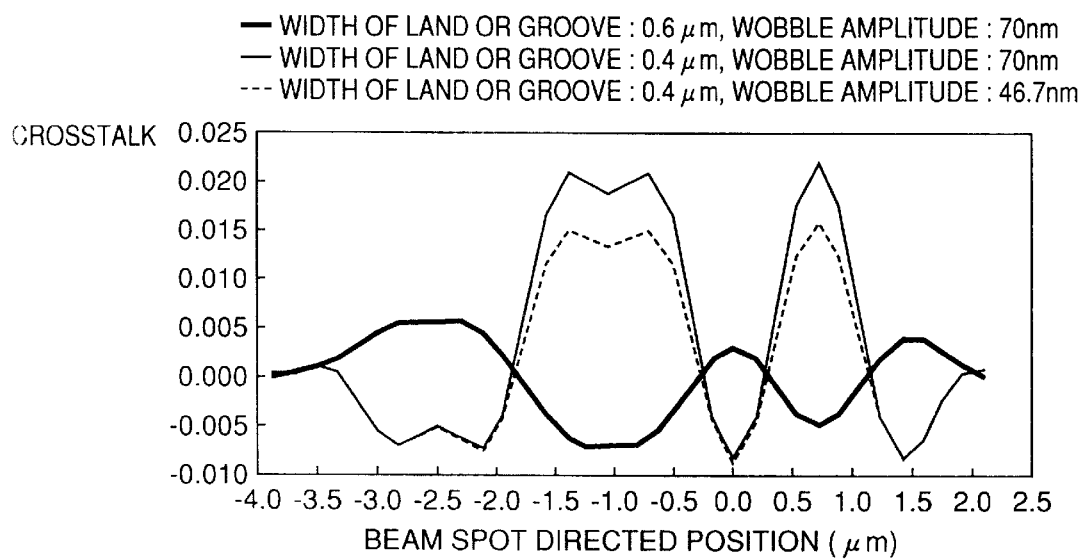
FIG. 15 shows the dependency of crosstalk on the land and groove width when address information is detected from the magneto-optical recording medium of FIG. 14.

In the magneto-optical recording medium of FIG. 14, the address information is arranged at the same position, i.e. radially. Therefore, in the detection of the address information, the address information recorded at the groove (or land) adjacent to the currently-scanned land (or groove) will be detected to increase crosstalk when the width of the land or groove is narrowed, as shown in FIG. 15.

Figure 16:
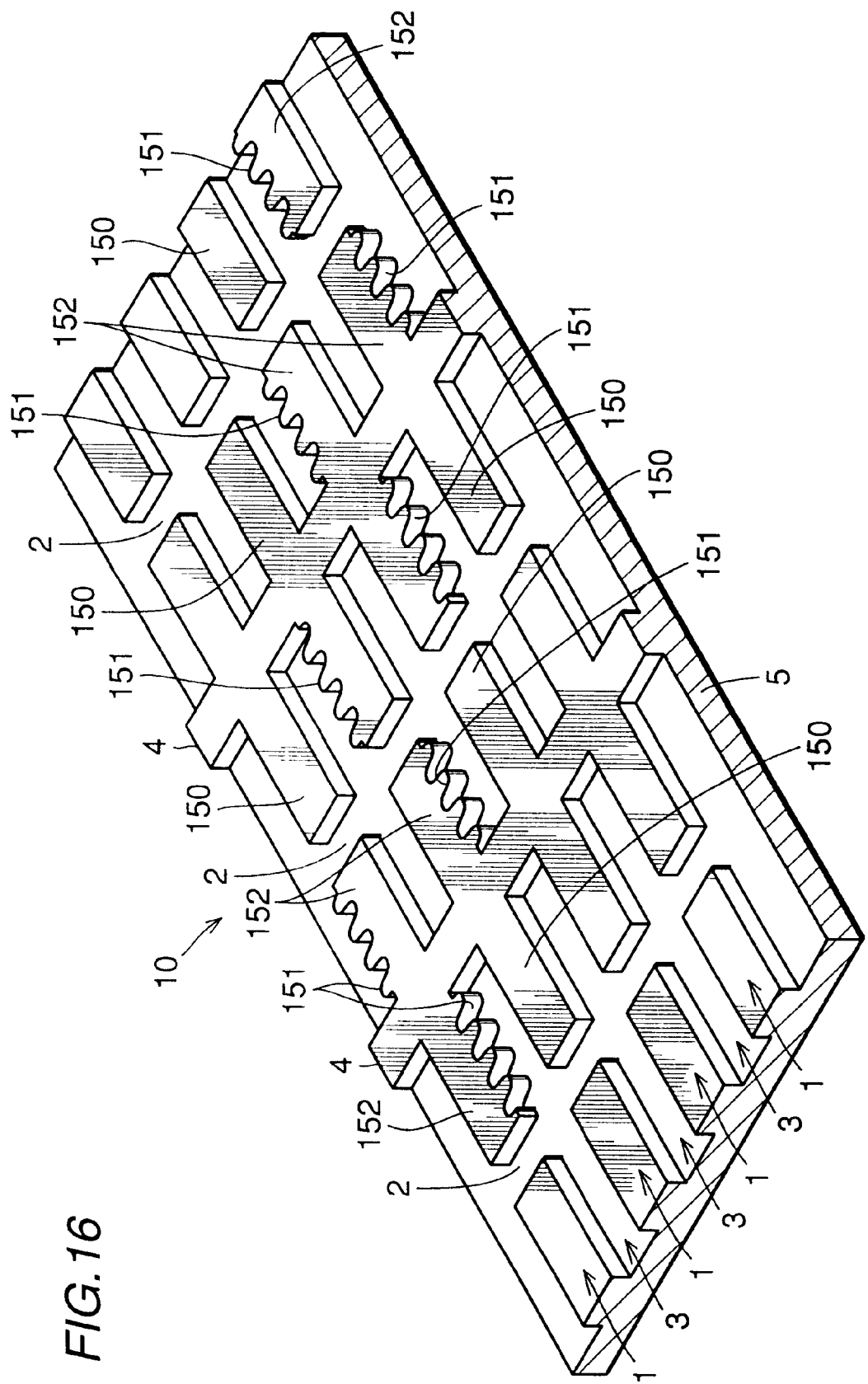
FIGS. 16 and 17 are perspective views showing a structure of the portion where address information is recorded in the magneto-optical recording media of FIGS. 4 and 8, respectively.

In view of the foregoing, magneto-optical recording medium 10 of FIG. 4 has an address region 152 arranged in an oblique manner with respect to the radial direction of magneto-optical recording medium 10, as shown in FIG. 16. Each address region 152 precedes a data region 150. In each address region 152, one side wall 151 of groove 1 is wobbled according to the address. More specifically, one address region 152 in each groove 1 is adjacent to an address region 152 in another groove 1 adjacent to that groove 1. Another address region 152 in groove 1 is adjacent to data region 150 in that another groove 1.

Figure 17:
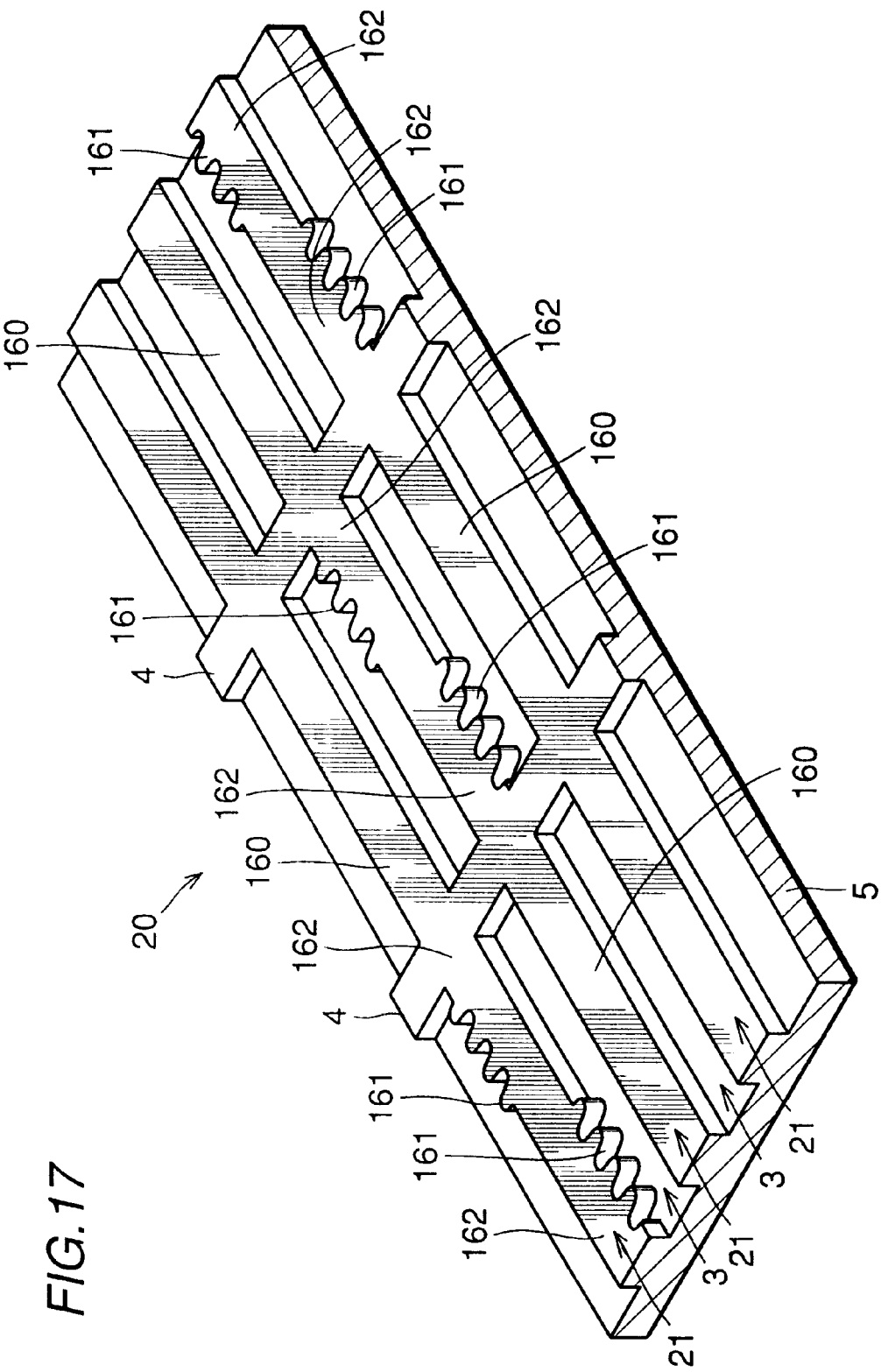

Similarly, magneto-optical recording medium 20 of FIG. 8 has an address region 162 arranged in a slided manner with respect to the radial direction of magneto-optical recording medium 20, as shown in FIG. 17. In each address region 162, one sidewall 161 of groove 21 is wobbled according to the address. It is to be noted that each address region 162 in each groove 21 is adjacent to data region 160 of another groove 21 adjacent to that groove 21 of interest, and is not adjacent to address region 162 in that another groove 21.

By arranging address regions 152 and 162 as described above, crosstalk from groove 21 or land 3 adjacent to the currently-scanned land 3 or groove 21 can be reduced even when the width of land 3 and grooves 1 and 21 is narrowed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magneto-optical recording medium comprising:

a substrate including grooves and lands provided alternately and forming a spiral or concentric track, wherein said lands have a plurality of first discontinuous regions formed periodically, wherein said grooves have a plurality of second discontinuous regions formed periodically, each of said second discontinuous regions is positioned between successive first discontinuous regions in successive lands adjacent to said grooves.

2. The magneto-optical recording medium according to claim 1, wherein each of said second discontinuous regions is positioned corresponding to a region at the center between said two first discontinuous regions.

3. The magneto-optical recording medium according to claim 1, wherein each of said grooves includes a plurality of data regions, and a plurality of address regions each preceding a corresponding data region and having a sidewall wobbled according to an address, said plurality of address regions arranged in an oblique direction with respect to a radial direction of said magneto-optical recording medium.

4. The magneto-optical recording medium according to claim 3, wherein a first address region in a first groove from said grooves is adjacent to a second address region in a second groove of said grooves adjacent to said first groove, and said second address region in said second groove is adjacent to a data region in a third groove of said grooves.

5. The magneto-optical recording medium according to claim 3, wherein one of said address regions in one of said grooves is adjacent to one of the data regions in a different one of the grooves.

6. A magneto-optical recording medium comprising:

a substrate including grooves and lands provided alternately and forming a spiral or concentric track, wherein ones of said lands and grooves are continuous and different ones of said lands and grooves have a plurality of discontinuous regions formed periodically, and wherein each of said lands and grooves has a width of 0.4 $\mu$m or less.

7. The magneto-optical recording medium according to claim 6, wherein each of said land and grooves has a width equal to or smaller than 0.44 times a spot diameter of a laser beam directed on said magneto-optical recording medium.

8. The magneto-optical recording medium according to claim 6, wherein each of said grooves includes a plurality of data regions and a plurality of address regions each preceding a corresponding data region and having a sidewall wobbled according to an address, said plurality of address regions aligned in an oblique direction with respect to a radial direction of said magneto-optical recording medium.

9. The magneto-optical recording medium according to claim 8, wherein one of said address regions in one of said grooves is adjacent to a different one of said address regions in a first different one of said grooves adjacent to said one of said grooves, and said different one of said address regions in said said first different one of said grooves is adjacent to a data region in a second different one of said grooves.

10. The magneto-optical recording medium according to claim 8, wherein one of said address regions in said one of said grooves is adjacent to a data region in a different one of said grooves adjacent to said one of said grooves.

* * * * *